United States Patent [19]

McFarland et al.

[11] 4,116,138

[45] Sep. 26, 1978

[54] AUTOMATIC FLUID FERTILIZER CONTROL APPARATUS

[76] Inventors: David Lee McFarland, P.O. Box 154; Raymond Joseph McFarland, P.O. Box 457, both of Gwinner, N. Dak. 58040

[21] Appl. No.: 774,512

[22] Filed: Mar. 4, 1977

[51] Int. Cl.² .............................................. A01C 23/02
[52] U.S. Cl. ........................................ 111/7; 222/608; 239/170
[58] Field of Search ............................ 222/527–529, 222/608, 626, 627; 111/6, 7; 239/170; 251/231, 232, 235; 47/1.7

[56] References Cited

U.S. PATENT DOCUMENTS

| | | | |
|---|---|---|---|
| 2,731,901 | 1/1956 | Tye | 111/7 X |
| 2,831,502 | 4/1958 | Osborn | 251/235 X |
| 2,838,825 | 6/1958 | Knollenberg | 251/232 X |
| 3,044,712 | 7/1962 | Tanke | 239/170 X |
| 3,793,967 | 2/1974 | VandenBerg | 111/7 |
| 3,905,523 | 9/1975 | Ahlers et al. | 222/608 X |

Primary Examiner—Allen N. Knowles
Assistant Examiner—Fred A. Silverberg
Attorney, Agent, or Firm—Dorsey, Windhorst, Hannaford, Whitney & Halladay

[57] ABSTRACT

A control valve for automatically controlling fluid fertilizer is introduced in a fluid fertilizer application system of the type comprising: a fertilizer supply; an implement having fertilizer application elements; means for moving said application elements between a lowered, application position and a raised, transport position; and conduit means for delivering fertilizer from the fertilizer supply to the application elements. The control valve is interposed in the conduit means between the fertilizer supply and the application elements and has a control lever terminating in a saddle adapted to receive a projection. A collapsible and extendable valve actuator means, which is responsive to the means for moving the application elements between raised and lowered positions and which has thereon a projection adapted to engage the valve control lever, controls the valve such that it is closed when the application elements are raised and open when the application elements are lowered.

12 Claims, 12 Drawing Figures

AUTOMATIC FLUID FERTILIZER CONTROL APPARATUS

BACKGROUND OF THE INVENTION

1. Field of the Invention

This invention relates to an automatic fluid control device, particularly of the type used to control the flow of fluid fertilizer in a fertilizer application system.

2. Description of the Prior Art

A fertilizer application system normally includes a fertilizer supply tank; a tractor-drawn implement such as a cultivator, tool bar or other implement suitable for fertilizer application; a supply hose leading from the supply tank to a flow meter valve mounted on the implement; pipe and hose apparatus affixed to the implement and used to convey fluid fertilizer from the flow meter valve to the point of application; and lifting means attached to the tractor and/or the implement suitable for raising and lowering the implement or the application elements thereof between a raised, travel position and a lowered, application position.

The basic problem of control of fluid fertilizer in such a system is simply defined. Control should be such that the flow of fertilizer can be switched on when the fertilizer application elements are in position in the soil at the proper depth; conversely, when the application elements are not in the soil, the flow of fertilizer should be shut off to avoid waste and the escape of noxious chemicals into the atmosphere. In the past, flow control has been achieved by a variety of means, including rope controls, electric controls and hydraulic controls affixed to the flow meter valve. While many prior art devices do not provide automatic control in response to the raising and lowering of application elements, at least one such automatic device is known (Tanke, U.S. Pat. No. 3,044,712). Both devices which are integral to a fertilizer application implement (e.g., Tanke, U.S. Pat. No. 3,044,712) and devices which are retrofitted onto existing equipment (e.g., Ahlers, et al., U.S. Pat. No. 3,905,523) are known. None of the prior art controls has proven to be particularly satisfactory. One basic problem is that constant on-off operation of the control mechanism and opening and closing of the flow meter valve may cause wear on the valve or its control mechanism, leading to breakage.

Electric controls often require an excessive amount of maintenance for performance and may perform poorly when the weather is cool or cold. They require hookups to be placed upon a tractor, as well as the implement to be controlled, and therefore, are not easily switched from tractor to tractor. Furthermore, the control is normally actuated by a solenoid device and shut off by a return spring mechanism, which is susceptible to breakage. Hydraulic control not only requires the addition of extra hydraulic equipment but, in the case of one-way hydraulic controls, the device may also rely on a return spring mechanism and have the same susceptibility to breakage. Finally, the rope control, the oldest control method known in the art, is the most dangerous, especially when anhydrous ammonia fertilizer is being used, because so many things can occur which prevent an operator from shutting off fertilizer flow. For example, the rope can break, or loop over and become caught on some part of the implement, or the spring mechanism used in connection with the rope can become jammed by foreign material. Finally, a rope control prevents the tractor operator from enjoying the full benefits of an enclosed cab, since the cab must normally be open to allow access to the rope control.

Most of these problems exist with the particular control device involved whether or not it is a retrofit device. However, with retrofit devices, a number of other problems can arise such as compatibility with different implements, adaptability for existing flow meters, the need for additional power sources and the need for additional operator controls. Accordingly, retrofit devices may raise as many problems as they solve.

SUMMARY OF THE INVENTION

According to the present invention, a control valve for automatically controlling the fluid fertilizer is introduced in a fluid fertilizer application system of the type comprising: a fertilizer supply; an implement having fertilizer application elements; means for moving said application elements between a lowered, application position and a raised, transport position; and conduit means for delivering fertilizer from the fertilizer supply to the application elements. The control valve is interposed in the conduit means between the fertilizer supply and the application elements and has a control lever terminating in a saddle adapted to receive a projection. A collapsible and extendable valve actuator means, which is responsive to the means for moving the application elements between raised and lowered positions and which has thereon a projection adapted to engage the valve control lever, controls the valve such that it is closed when the application elements are raised and open when the application elements are lowered.

It is an object of this invention to provide an apparatus for automatically and effectively controlling the flow of fluid fertilizer in response to the raising and lowering of the fertilizer application elements of a fertilizer application implement between their application and transport positions.

It is another object of this invention to provide an apparatus for reducing wear on a fertilizer flow metering device and the consequent risk of its breakage.

It is a further object of this invention to provide an apparatus for automatically controlling the flow of fluid fertilizer in response to the depth of penetration into the soil of fertilizer application equipment.

It is a still further object of this invention to provide a safe, convenient method of controlling fluid fertilizer flow which minimizes the danger of breakage, jamming or other malfunction of the control apparatus.

It is yet another object of this invention to provide an apparatus for automatically and effectively controlling the flow of fluid fertilizer, which can be easily added to conventional single-point hitch fertilizer application implements without the need for additional hydraulic equipment or other power means.

It is still another object of this invention to provide an apparatus for automatically and effectively controlling the flow of fluid fertilizer which can be easily added to a conventional three-point hitch mounted fertilizer application system without the need for additional hydraulic equipment or other power means.

These and other objects of the invention will be apparent from a consideration of the following description and the accompanying drawings in which like reference numbers refer to like parts throughout.

BRIEF DESCRIPTION OF THE DRAWINGS

FIG. 1b is an enlarged partial side elevation of the embodiment shown in FIG. 1a.

FIG. 5b is an enlarged partial side elevation of the embodiment shown in FIG. 5a.

DESCRIPTION OF THE PREFERRED EMBODIMENTS

Figure 1:
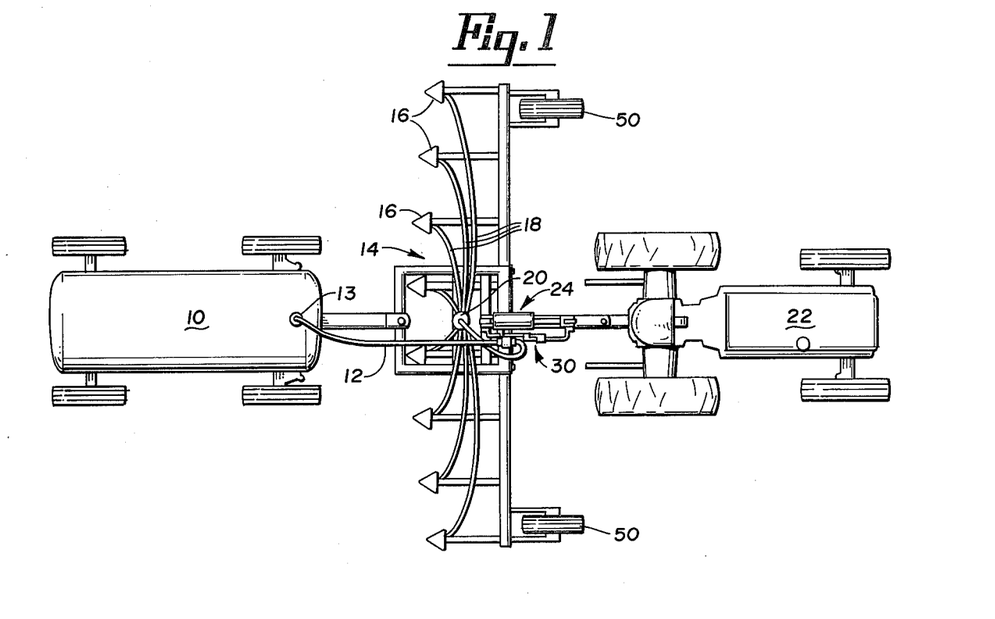
FIG. 1 is a plan view of a single-point hitch type fertilizer application system in which the present invention constitutes an improvement.
Figure 1A:
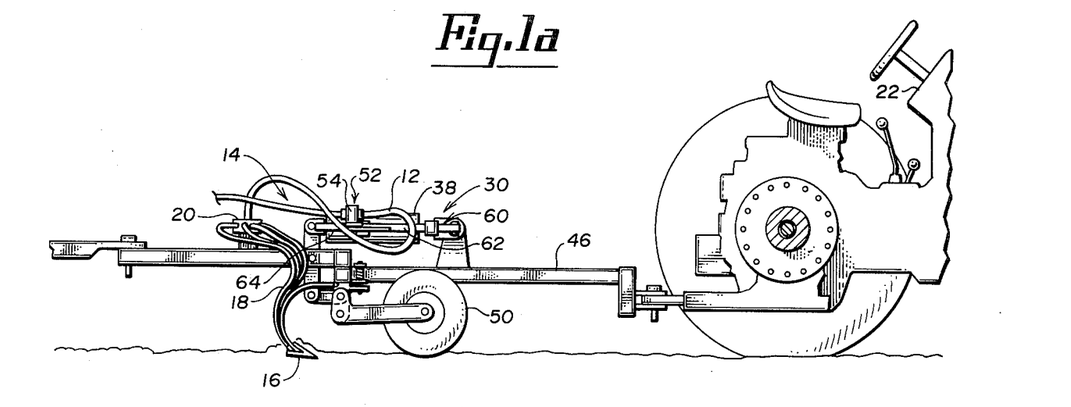
FIG. 1a is a slightly enlarged partial side elevation of the single-point hitch type fertilizer application system shown in FIG. 1.
Figure 1B:
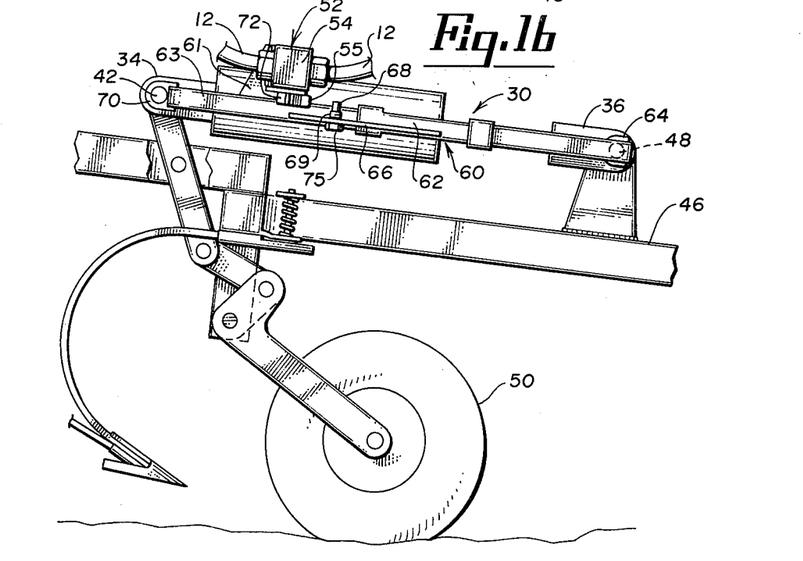

Referring now to FIGS. 1, 1a, 1b the invention as used with a single-point hitch fertilizer application system is indicated generally at 30. As shown in the figures, the environment in which the invention is used is a fertilizer application system which includes a fertilizer supply tank 10; a cultivator, tool bar or other implement 14 drawn by a draft vehicle 22 and suitable for fertilizer application; a supply hose 12 leading from a master valve 13 on the supply tank 10 to the apparatus of the invention 30 and thence to the flow meter valve 20; and hoses 18 leading from the flow meter 20 to the chisels or other fertilizer application elements 16. The implement 14 includes lifting means 24, shown in FIGS. 1, 2a, 2b as being powered by a hydraulic cylinder or other collapsible power means, for raising and lowering the implement wheels 50, thereby moving the implement between a raised, transport position whereby the application elements 16 are not in the soil and a lowered, application position whereby the application elements 16 penetrate the soil to the desired application depth.

Figure 2:
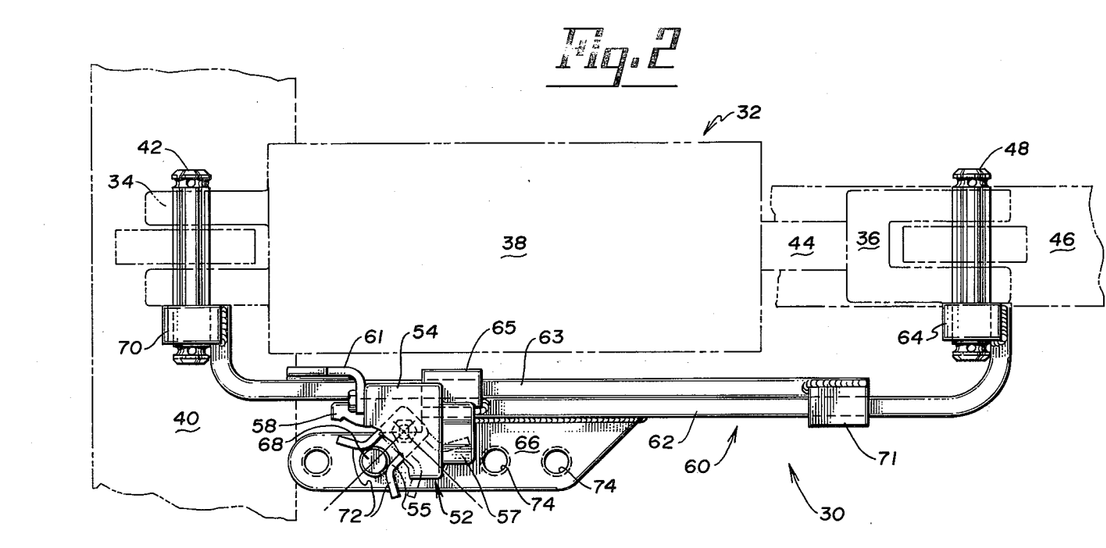
FIG. 2 is a plan view of an embodiment of the automatic fluid fertilizer control apparatus of the present invention as designed for use with a single-point hitch implement which uses a hydraulic cylinder to move the fertilizer application elements.
Figure 3:
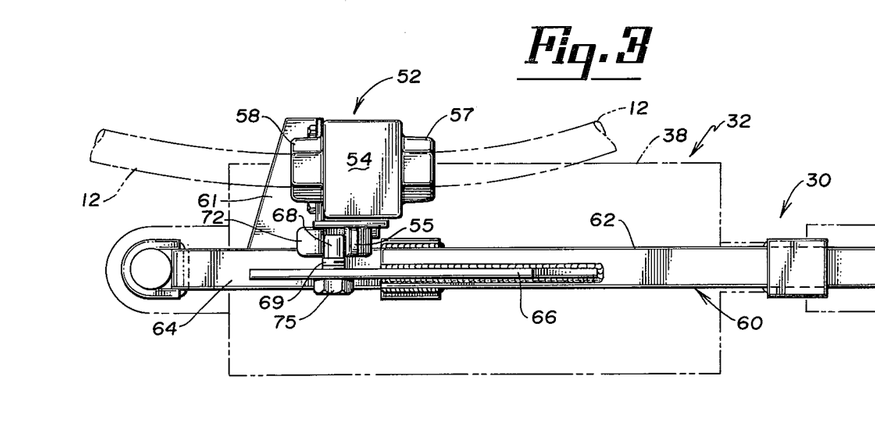
FIG. 3 is a side elevation of the embodiment shown in FIG. 2.

The automatic fluid fertilizer control apparatus 30 of the present invention is shown in greater detail in FIGS. 2 and 3, in an embodiment designed for use in a single-point hitch arrangement with a hydraulic cylinder used to raise and lower the application elements. In such an arrangement, the lifting means 24 (FIG. 1) for moving the implement 14 between transport and application positions is a double-acting hydraulic cylinder 32 having clevis ends 34, 36. The clevis 36 on the end nearest hydraulic piston shaft 44 is attached to the tongue 46 of the implement 14 by means of pin 48. The clevis 34 on the end nearest the hydraulic cylinder body 38 is connected with lifter bar 40 of the implement 14 via pin 42. In normal operation, the extension of the hydraulic cylinder 32 pushes the wheels 50 of the implement 14 downward such that the application elements 16 are raised out of the soil (See FIG. 1b). Correspondingly, collapsing the hydraulic cylinder 32 lowers the application elements 16 into the soil (see FIG. 1a.).

The apparatus of the present invention comprises a control valve 52 which is inserted in the supply hose 12 (not shown in FIG. 2) between the tank 10 and the flow meter 20, and a collapsible and extendable actuator assembly 60 for switching the control valve 52 between open and closed positions in response to the contraction or extension of the hydraulic cylinder 32. The control valve 52, which is a rotary valve in the preferred embodiment, consists of a valve body 54 containing the valve closure elements (not shown) and having a control lever 55, terminating in a Y-shaped saddle 72, which moves the closure elements between open and closed positions, whereby the flow of fertilizer through the supply hose 12 is regulated. Supply hose 12 is attached to the valve 52 by means of couplings 57, 58 on either side of the valve body 54. The valve 52, as a unit, is mounted on the slide bar 63 by means of a bracket 61.

The collapsible actuator assembly 60 consists of two slide bars 62, 63 and a plate 66 having a projection, which in the preferred embodiment is a pin 68, mounted thereon. The first of the two slide bars 62 is roughly L-shaped with small sleeves 64, 65 located on each end. One end of the first slide bar 62 is connected to the piston shaft end of the hydraulic cylinder 32 by passing the pin 48 which fastens the clevis 36 to the tongue 46 through the small sleeve 64 on that end. The sleeve 65 on the other end of the slide bar 62 encircles the second of the slide bars 63, which is also roughly L-shaped and also has small sleeves 70, 71 on each end. One end of this second slide bar 63 is connected to the cylinder body end of the hydraulic cylinder 32 by passing the pin 42 which fastens the clevis 34 to the lifter bar 40 of the implement 14 through the short sleeve 70 on that end. The sleeve 71 on the other end of this second slide bar 63 encircles the first of the slide bars 62. The inside size and shape of the sleeves 65 and 71 matches the shape and size of slide bars 63, 62, respectively, such that a snug, sliding fit results. Due to the connection of the sleeves 64, 70 with the ends of the hydraulic cylinder 32 and the interlocking of the slide bars 62, 63 by means of the sleeves 65, 71 encircling the slide bars 63, 62, respectively, extension or contraction of the hydraulic cylinder 32 causes the slide bars 62, 63 to move in a telescoping manner relative to each other in opposite directions.

The plate 66 on which actuator pin 68 is mounted is affixed by welding or any other suitable means to the first of the slide bars 62. The pin 68 and plate 66 are disposed on slide bar 62 such that the telescoping movement of the slide bars 62, 63 in response to the movement of the hydraulic cylinder 32 causes the pin 68 to move along a linear path adjacent the control valve 52, which is disposed in such a way that the Y-shaped saddle 72 of the control lever 55 engages and is moved by the pin 68 during its linear movement. When the control lever 55 of the control valve 52 is moved through an angle of 90°, it switches the valve 52 from open to closed or vice versa, depending on the direction in which the lever 55 is rotated. In the embodiment shown in FIGS. 2 and 3, the valve 52 is chosen such that its open position is as indicated by the position of the control lever 55 shown in solid lines, while its closed position is as shown by dotted lines. Accordingly, a collapsing motion of the cylinder 32 drives the closed valve 52 to its open position, while extension of the cylinder 32 drives the open valve 52 to its closed position. Because, as explained above, the collapsing and extending of the cylinder 32 correspond to the lowering (FIG. 1a) and raising, (FIG. 1b) respectively, of the application elements 16, automatic control of the opening and closing of the valve 52 is achieved in coordination with the movement of the application elements 16 between transport and application positions.

The embodiment of the fluid fertilizer control apparatus shown in FIGS. 2 and 3 incorporates certain adjustability features permitting it to fit a variety of implements. Because the stroke length of the hydraulic cylinder 32 may vary between implements, it is useful to be able to adjust the maximum extended length of the collapsible actuator assembly 60 as well as the position of the pin 68 relative to the slide bar 62 and plate 66 with which it is connected. In the embodiment shown in FIGS. 2 and 3, adjustment of the position of pin 68 is accomplished by placing its threaded end 69 in one of the threaded holes 74 in the plate 66 and holding it in place with a nut 75. The available range of adjustment is, of course, determined by the distance between the first and last holes in the row.

Adjustment of the length of the collapsible actuator assembly 60 can be accomplished in several ways. In the embodiment shown in FIGS. 2 and 3, the length of overlap between slide bars 62, 63 determines the maximum extended length of the assembly 60. The location of the rotary valve 52 as mounted on slide bar 63, determines the minimum actuator assembly length because of the interference between the sleeve 65 and the valve mounting bracket 61 in the extreme collapsed position. Thus, the actuator assembly shown in FIGS. 2 and 3 can be adjusted to fit cylinders of different overall lengths merely by extending or contracting the collapsible actuator assembly 60.

Figure 4:
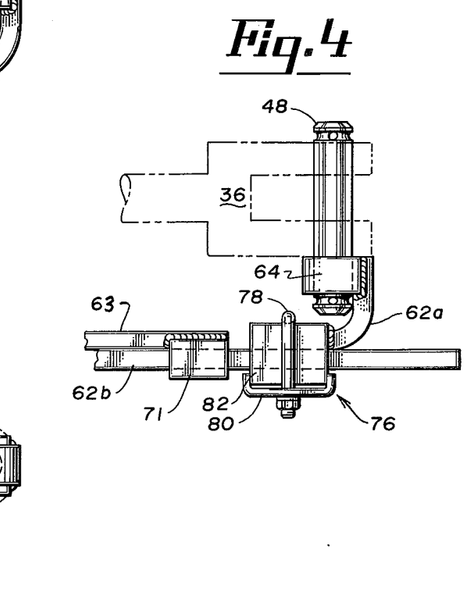
FIG. 4 is a side elevation and detail of a variation in the position-adjusting means of the embodiment shown in FIGS. 2 and 3.

Another means of achieving adjustability appears in the variation of the preferred embodiment shown in FIG. 4. In this alternate structure, the slide bar 62 is made up of two portions 62a and 62b such that its effective length can be varied. To accomplish this, the shorter portion 62a to which the sleeve 64 is attached is adjustably affixed to the longer portion 62b by means of a slidable assembly 76 comprising a U-bolt 78, a plate 80 having bent ends and a friction block 82. By tightening the U-bolt 78, the slidable assembly 76 can be securely fixed to the longer portion 62b of the slide bar 62. Adjustment of the length of this assembly is accomplished by changing the point at which assembly 76 is clamped.

The preceding adjustments are used to ensure that the valve control lever 55 will be engaged and turned through a 90° arc when the hydraulic cylinder 32 is collapsed or extended to move the application elements 16 from their transport position to their application position and vice versa. In the preferred embodiment, a rotary valve 52 was chosen with the control lever 55 and Y-shaped saddle 72 sized such that a minimum distance of translation of 1½ inches of the pin 68 is required to move the valve 52 between open and closed positions. Accordingly, a minimum hydraulic cylinder stroke length of 1½ inches is required. Use of a piston having greater stroke length causes no difficulty since the pin 68 may have its rest points, as defined by the extreme points of the cylinder stroke, at any distance from the rotary valve 52 as long as engagement of the control lever 55 by the pin 68 occurs when the cylinder 32 goes from one extreme point to the other.

In the embodiments shown in FIGS. 2, 3 and 4, proper adjustment of the length of the actuator assembly 60 and the position of the pin 68 combined with use of a cylinder 32 having a stroke length greater than the minimum required to operate the rotary valve 52, may permit delayed shut-off of the fluid fertilizer to be achieved. To accomplish this, the pin 68 and the actuator assembly 60 are adjusted so that the pin 68 does not drive the control lever 55 of the rotary valve 52 to its closed position until the hydraulic cylinder 32 has raised the application elements 16 a certain distance away from their depth of deepest penetration into the soil. Correspondingly, delayed opening of the valve 52 can be effected by adjusting the pin 68 and the actuator assembly 60 such that the control lever 55 is not driven to its open position until the hydraulic cylinder 32 has lowered the application elements 16 a certain distance into the soil. To make either of these latter adjustments, it is necessary only to observe the correspondence between the position of the hydraulic cylinder 32, the pin 68 and the control lever 55, and the location of the application elements 16 relative to the surface of the soil. If this correspondence is known, the appropriate adjustments to the pin 68 and/or the slidable assembly 76 can be made.

When the collapsible actuator assembly 60 is mounted on the implement 14, two types of adjustments must be considered. First, the overall length of the assembly 60 must be adjusted so that the sleeve 64 can fit onto the pin 48 at the piston shaft end of the cylinder 32, while the sleeve 70 fits onto the pin 42 at the piston body end of the cylinder 32 when the cylinder 32 is fully extended. In some instances, interference between the sleeve 71, which encircles slide bar 62, and the plate 66 may prevent the actuator assembly 60 from reaching the full length of the cylinder 32 when extended. In such cases, if the embodiment shown in FIG. 4 is being used, the slidable assembly 76 may be moved to lengthen the reach of the actuator assembly 60. At the other extreme, the possibility of interference between the sleeve 65 and the valve mounting bracket 61 when the piston 32 is fully collapsed must also be checked. Here also the embodiment shown in FIG. 4 may allow for some corrective adjustment.

When the length of the actuator assembly 60 has been fitted to the cylinder 32, a further adjustment step is performed to ensure that the rotary valve 52 will be properly controlled in response to the movement of the cylinder 32 and the actuator assembly 60. For this adjustment, the pin 68 is placed in one of the holes 74 in the plate 66 selected such that the collapsing and extending motion of the cylinder 32 through its normal stroke translates the pin 68 between a point on the right side of the valve body 54 (as seen in FIGS. 1a 2 and 3) and a point on the left side of the valve body 54 (as shown in FIGS. 2 and 3), whereby the valve 52 is fully switched from open to closed and vice versa.

Figure 5:
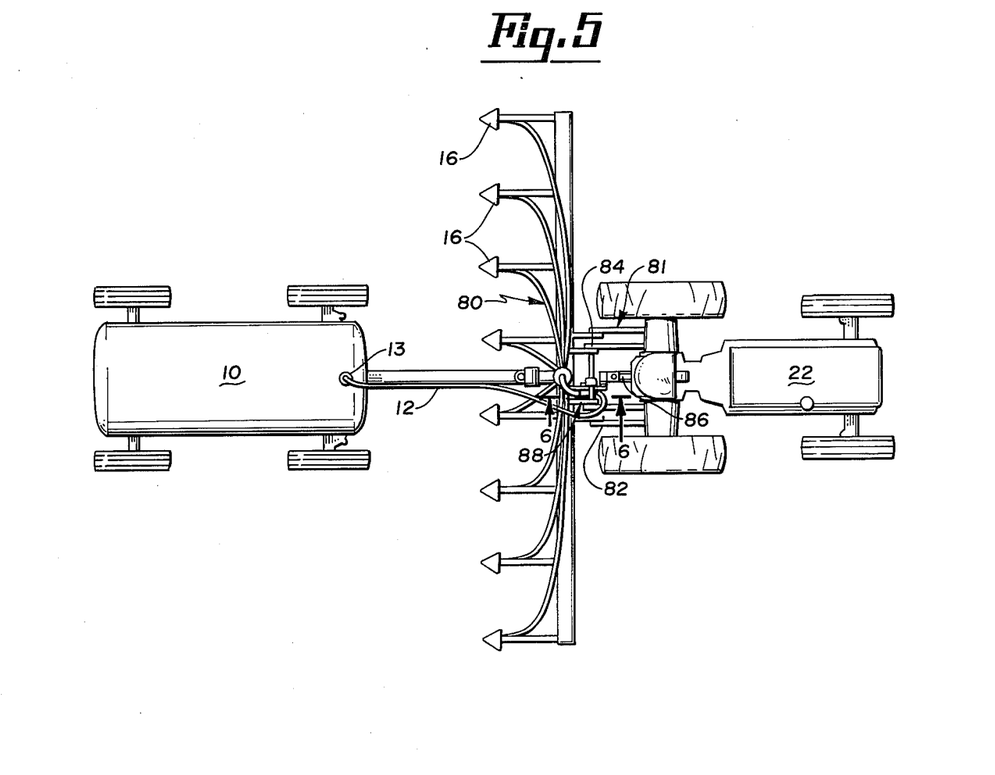
FIG. 5 is a plan view of a second embodiment of the automatic fluid fertilizer control apparatus of the present invention as designed for use with a fertilizer application implement mounted on a three-point hitch.
Figure 5A:
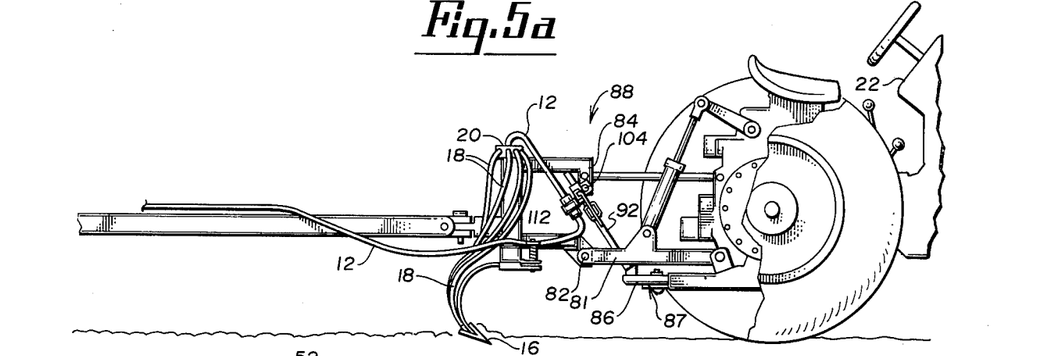
FIG. 5a is a slightly enlarged partial side elevation of the embodiment of the automatic fluid fertilizer control apparatus shown in FIG. 5.
Figure 5B:
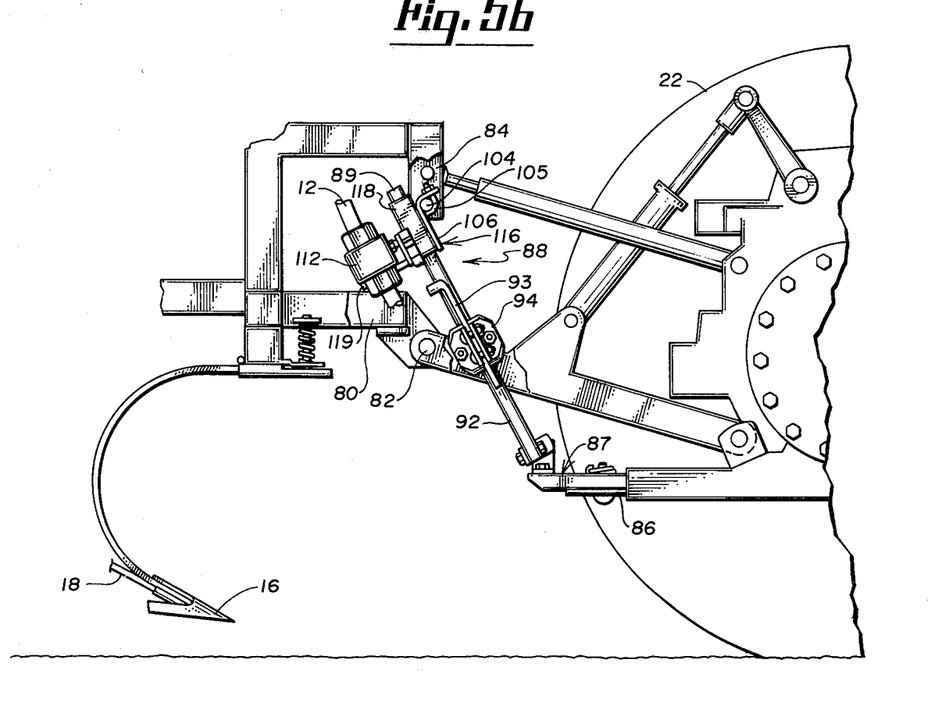

Shown in FIGS. 5, 5a, 5b, 6, 7 and 8 is an alternate embodiment of the invention as designed for an implement 80 mounted on the three-point hitch 81 of a draft vehicle 22. The general configuration of the implement 80, the lower implement mounting points 82 and the upper hitch point 84 appears in FIG. 6. As best seen in FIGS. 5a and 5b, the basic difference between the single-point hitch and the three-point hitch for purposes of this invention is that with the three-point hitch the entire implement 80 is lifted from the ground for transport and that this lifting occurs when the three mounting/hitch points 82, 84 are translated in an upward direction relative to the ground and the drawbar 86 of the draft vehicle 22.

Figure 6:
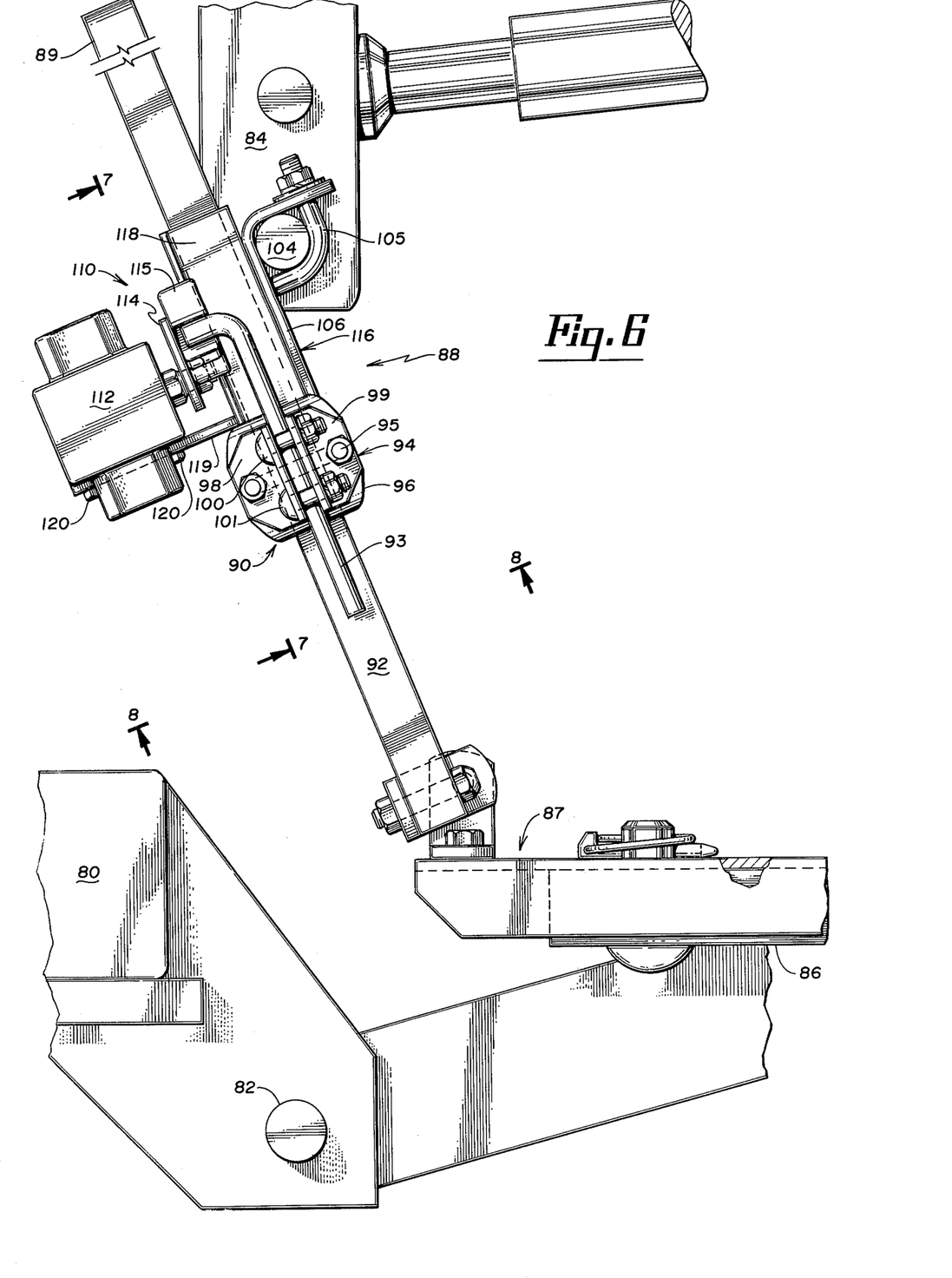
FIG. 6 is a side elevation of the second embodiment of the automatic fluid fertilizer control apparatus as shown in FIG. 5.
Figures 7, 8:
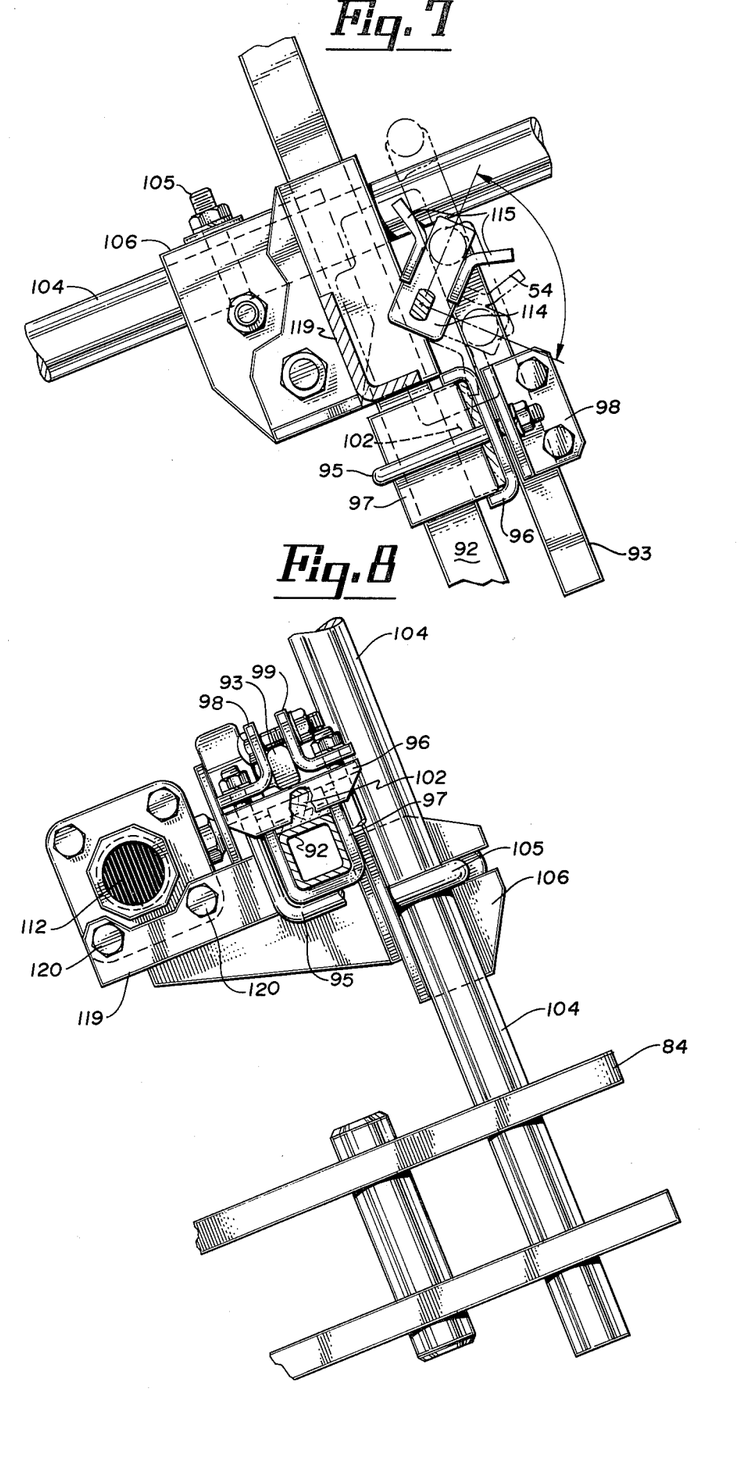
FIG. 7 is an auxiliary view taken along the line 7—7 of FIG. 6.
FIG. 8 is an auxiliary view taken along the line 8—8 of FIG. 6.

Referring now to FIGS. 6, 7 and 8, the embodiment of the present invention, as designed for a three-point hitch mounted implement 80, is shown in greater detail. As seen best in FIG. 6, the actuator assembly 88 for this embodiment is made up of two subassemblies 90, 110 which move relative to one another, in a manner analagous to the relative motion of the two L-shaped slide bars 62, 63 in the single-point hitch embodiment discussed above. The slide tube assembly 90 comprises: a hollow slide tube 92 of square cross section, pivotally mounted to the tractor drawbar 86 by means of a bolt, plate, channel and pin assembly 87 connecting the lower end of the slide tube 92 to the drawbar 86; and a generally L-shaped actuator rod 93 which is connected to the slide tube 92 by means of a friction slide mounting bracket 94. The upper end 89 of the slide tube 92 is not attached to anything. The slide mounting bracket 94 is clamped to the slide tube 92 by means of U-bolt 95 and C-shaped plates 96, 97. The actuator rod 93 is, in turn, clamped by angle pieces 98, 99 and bolts 100, 101. Accordingly, the friction slide mounting bracket 94 and the actuator rod 93 are fixed relative to the slide tube 92. As a safety feature, a small piece of wood or other non-metallic material 102 is placed inside plates 96, 97 so that one of the four surfaces of contact between slide tube 92 and the friction slide mounting bracket 94 is a wood-metal interface. Thus, should the friction slide mounting bracket 94 ever be subjected to large downward forces, it will tend to slide along slide tube 92 before any metal parts shear or break.

The valve subassembly 110 of the actuator assembly 88 comprises the same type of rotary control valve 112 having a control lever 114 as found in the previously described embodiment and a slide bracket 116 to which the valve 112 is affixed. The slide bracket 116 comprises a short length of square tubing 118 having inside dimensions slightly larger than the outside dimensions of slide tube 92, such that the tubing 118 slides easily along the slide tube 92; and a plate 119, affixed to the tubing 118, on which the valve 112 is mounted by means of bolts 120. The rotary valve subassembly 110 is connected to the upper hitch point 84 by means of a rod 104 passing through the upper hitch point 84. The rod 84 is clampingly held by means of an L-bolt 105 and an angle bent plate 106 welded to the tubing 118.

The short end of L-shaped actuator rod 93 and the Y-shaped saddle 115 of the control lever 114 are disposed relative to the slide tube 92 and the slide bracket 116 such that the movement of the slide bracket 116 and the valve 112 in response to the raising of the upper hitch point 84 causes the short end of the L-shaped actuator rod 93 to engage the Y-shaped saddle 115 of the control lever 114. As in the first embodiment, discussed above, when the control lever 114 of the control valve 112 is moved through an angle of 90°, it switches the valve 112 from open to closed or vice versa. In the embodiment shown in FIGS. 5a, 5b, 6, 7 and 8, the valve 112 is chosen such that its open position is as indicated by the position of the control lever 114 shown in FIG. 7 in solid lines, while its closed position is as shown by dotted lines. Accordingly, a raising motion of the upper hitch point 84 causes the slide bracket 116 to be raised. (See FIG. 5b.) When this occurs, the actuator rod 93 engages the saddle 115 of the control lever 114, rotating it clockwise, as seen in FIG. 7. Thus, the valve 112 is driven to its closed position. Correspondingly, lowering of the upper hitch point 84 drives the valve 112 to its open position. (See FIGS. 5a, 6.) Because, as mentioned above in the description of operation of a three-point hitch, raising and lowering the upper hitch point 84 correspond to raising and lowering the implement 80, automatic control of the opening and closing of the valve 112 is achieved in coordination with the motion of implement 80 and its application elements 16.

As with the previously discussed single-point hitch embodiment, the three-point hitch embodiment of the invention has certain adjustments to permit it to fit a variety of implements and hitches. In particular, the adjustments are used to accommodate the extent of movement by the upper hitch point 84 necessary for raising and lowering the implement 80 or to provide for delayed turn-on or shut-off of fertilizer. All adjustments are made by fixing the friction slide bar mounting bracket 94 at various locations on the slide tube 92. As with adjustments of the single-point hitch embodiment, to achieve these various adjustment goals, it is necessary to observe the correspondence between the position of the three-point hitch 81, the actuator rod 93, the control lever 114 and the location of the application elements 16 relative to the surface of the soil.

Although the description of the preferred embodiments has been quite specific, it is contemplated that various modifications of the device disclosed herein could be made without deviating from the spirit of the invention. For example, it is clear that the control valve need not be a rotary valve, but rather may be any valve whose control lever can be rigged to respond to linear motion of a projection. Similarly, it is clear that the essential thing is that there be relative movement between the valve and a projection and that it is immaterial which part moves relative to the other, or whether both move in coordination. Likewise, it would be clear to one skilled in the art that the hydraulic cylinder 32 in the single point hitch embodiment could be reversed in orientation, so that the cylinder body 38 is connected to the implement tongue 46, rather than to the lifter bar 40, thus reducing wear and tear on hydraulic tubes. As a final example of a variation which would be within the spirit of this invention, it is noted that only one end of the actuator assembly 60 of the first embodiment may be connected to the hydraulic cylinder 32, as long as the movement of the hydraulic cylinder is used to extend or collapse the actuator assembly 60. Thus, it is intended that the scope of the present invention be dictated by the appended claims rather than by the preferred embodiments described above.

What is claimed as new and desired to be secured by Letters Patent of the United States is:

1. In a fluid fertilizer application system of the type comprising:
   a fertilizer supply;
   an implement having fertilizer application elements;
   means for moving said application elements between a lowered, application position and a raised, transport position; and conduit means for delivering fertilizer from the fertilizer supply to the application elements;
   the improvement comprising:

valve means interposed in said conduit means for delivering fertilizer from the fertilizer supply to the application elements, said valve means having a control lever having projection engaging means; and collapsible and extendable valve actuator means, at least a portion of which is movable relative to said valve means in response to said means for moving said application elements between raised and lowered positions, said relatively movable portion of said actuator means having thereon a projection for engagement by said control lever, whereby movement of said relatively movable portion of said actuator means in response to said means for moving said application elements causes the projection on said actuator means to engage and to move said control lever such that said valve means is open when the application elements are in said lowered position and closed when the application elements are in said raised position.

2. The fluid fertilizer application system recited in claim 1 wherein:

the means for moving said application elements comprises as a hydraulic cylinder connected to said implement; and the valve actuator means has two ends, at least one of which is connected with one end of the hydraulic cylinder whereby movement of the cylinder in raising and lowering the application elements brings the projection into engagement with said projection engaging means such that said valve is moved between its open and closed positions.

3. The fluid fertilizer application system recited in claim 1 wherein:

the means for moving said application elements comprises a hydraulic cylinder connected to said implement; and the valve actuator means has two ends, each of which is connected with an end of the hydraulic cylinder, whereby movement of the cylinder in raising and lowering the application elements brings the projection into engagement with said projection engaging means such that said valve is moved between its open and closed positions.

4. The fluid fertilizer application system recited in claim 3 wherein the valve actuator means is adjustable to fit hydraulic cylinders of various stroke lengths.

5. The fluid fertilizer application system recited in claim 1 wherein the projection engaging means on the control lever is generally Y-shaped and said valve means is a rotary valve.

6. The fluid fertilizer application system recited in claim 1 wherein:

the means for moving said application elements comprises a three-point hitch on a draft vehicle, said hitch being attached to the implement; and the valve actuator means has two parts, one of which is connected with a point on the draft vehicle which is stationary relative to the movement of the three-point hitch and the other part of which is connected with the three-point hitch, one of said two parts being said portion which is movable relative to said valve means and having said projection thereon, whereby movement of the three-point hitch in raising and lowering the implement brings the projection into engagement with said projection engaging means such that said valve is moved between its open and closed positions.

7. An automatic fluid fertilizer control apparatus for use in a fluid fertilizer application system having a fertilizer supply, an implement with fertilizer application elements, means for moving the application elements between a lowered, application position and a raised, transport position and conduit means for delivering fertilizer from the fertilizer supply to the application elements comprising:

valve means interposed in said conduit means for delivering fertilizer from the fertilizer supply to the application elements, said valve means having a control lever having projection engaging means; and collapsible and extendable valve actuator means, at least a portion of which is movable relative to said valve means in response to said means for moving said application elements between raised and lowered positions, said relatively movable portion of said actuator means having thereon a projection for engagement by said control lever, whereby movement of said relatively movable portion of said actuator means in response to said means for moving said application elements causes the projection on said actuator means to engage and move said control lever such that said valve means is open when the application elements are in said lowered position and closed when the application elements are in said raised position.

8. The fluid fertilizer application system recited in claim 7 wherein:

the means for moving said application elements comprises a hydraulic cylinder connected to said implement; and the valve actuator means has two ends, at least one of which is connected with one end of the hydraulic cylinder, whereby movement of the cylinder in raising and lowering the application elements brings the projection into engagement with said projection engaging means such that said valve is moved between its open and closed positions.

9. The fluid fertilizer application system recited in claim 7 wherein:

the means for moving said application elements comprises a hydraulic cylinder connected to said implement; and the valve actuator means has two ends, each of which is connected with an end of the hydraulic cylinder, whereby movement of the cylinder in raising and lowering the application elements brings the projection into engagement with said projection engaging means such that said valve is moved between its open and closed positions.

10. The fluid fertilizer application system recited in claim 9 wherein the valve actuator means is adjustable to fit hydraulic cylinders of various stroke lengths.

11. The fluid fertilizer application system recited in claim 7 wherein the projection engaging means on the control lever is generally Y-shaped and said valve means is a rotary valve.

12. The fluid fertilizer application system recited in claim 7 wherein:

the means for moving said application elements comprises a three-point hitch on a draft vehicle, said hitch being attached to the implement; and the valve actuator means has two parts, one of which is connected with a point on the draft vehicle which is stationary relative to the movement of the three-point hitch and the other part of which is connected with the three-point hitch, one of said two parts being said portion which is movable relative to said valve means and having said projection thereon, whereby movement of the three-point hitch in raising and lowering the implement brings the projection into engagement with said projection engaging means such that said valve is moved between its open and closed positions.

* * * * *